Feb. 24, 1931.  C. A. COOK  1,794,150

TRANSMISSION MECHANISM

Filed May 3, 1929

Inventor
Clifford A. Cook
by Heard Smith & Tennant
Attys.

Patented Feb. 24, 1931

1,794,150

UNITED STATES PATENT OFFICE

CLIFFORD A. COOK, OF MILFORD, MASSACHUSETTS

TRANSMISSION MECHANISM

Application filed May 3, 1929. Serial No. 360,277.

This invention relates to power transmission devices and is especially directed to that type of transmission which is used in motor vehicles for changing the relative speed of the engine shaft in relation to the speed of the drive shaft.

The general object of the invention is to provide a speed changing mechanism which will permit the change from one speed to another with the least possible effort both mental and physical.

The object of the invention is further to provide such a mechanism wherein the parts may be constructed according to the normal requirements as to sizes and yet be capable of withstanding excessive shocks without breakage.

The object of the invention is further to provide a transmission in which the elements whose function it is to clutch the engine or driven shaft to the driving shaft presenting substantially the full area of their clutch faces at the instant of contact.

The object of the invention is further to provide a transmission in which the clutching elements upon the speed changing member may have an uninterrupted helical path in passing from one speed position into full engagement with the clutch faces upon the gear which transmits power to the driving shaft at the next required speed ratio.

The invention is further to provide a speed changing mechanism in which the various speed positions are in line thus providing for a simple normal motion in one plane with which to completely control the mechanism.

The object of the invention is further to provide a transmission which may be shifted from one speed to another rapidly and without regard for the differences of speed existing between the driven shaft and the gear to be engaged therewith.

The invention is further to provide a transmission mechanism in which a direct connection may be established between the driven and the driving shaft at which time all other movable elements will be motionless.

The object of the invention is further to provide a transmission in which a sprocket and chain connection is used to establish a reverse direction of rotation relative to that obtained by the use of gears in mesh.

Other objects and features will more fully appear from the following description in connection with the accompanying drawings and will be particularly pointed out in the claims.

Figure 1:
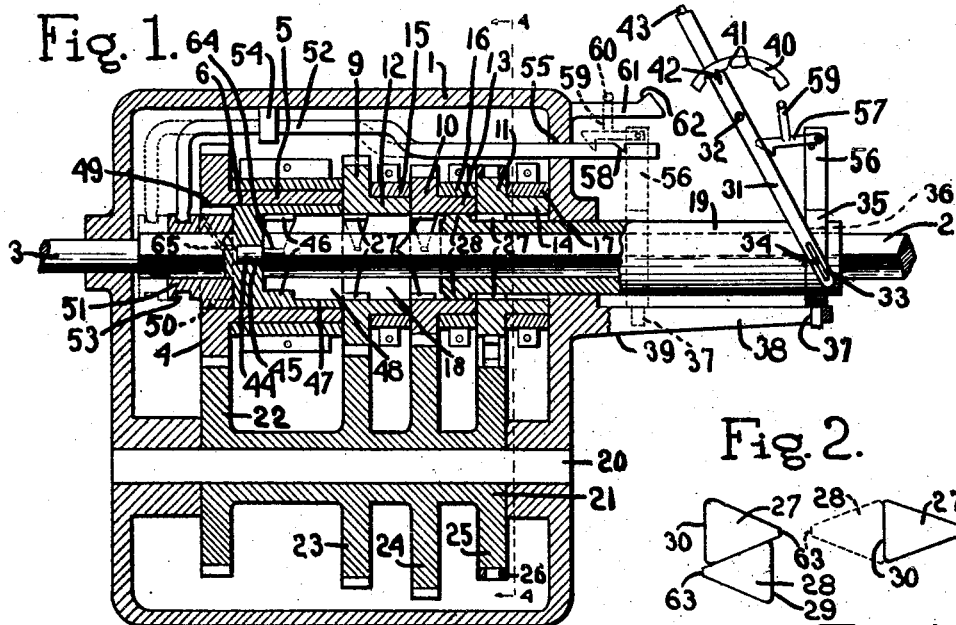
Fig. 1 is a cross sectional view through the axis of the counter shaft and both driven and driving shafts illustrating diagrammatically the manually operable means for changing the speed ratio.

The drawings illustrate a particular embodiment of the invention. It is to be understood however that the particular arrangement therein set forth may be modified to the extent permissible by the scope of the accompanying claims.

It is desirable in the design of any transmission mechanism that the driven shaft be in alignment with the driving shaft and such construction is embodied in the present invention although it not an essential part thereof. Means are provided to establish a positive direct connection between the driven shaft and the driving shaft at which time the rest of the mechanism has no function. Furthermore means are also provided to disconnect that part of the mechanism which does not function at this time. When such a mechanism is installed in a motor vehicle this direct connection exists for the greater part of the time during the operation of the vehicle. In other words the vehicle will be in what is commonly known as "high gear" for the major part of the time it is in operation. By disconnecting the idle portion of the mechanism none of the gears in the mechanism are in rotation, thus unnecessary wear of the parts is avoided. One of the most important features of the invention resides in the construction of the means for clutching together the driven shaft and the various independently rotatable speed changing gears. The hubs of these gears have central cylindrical apertures to receive a sleeve which slides upon the driven shaft and rotates therewith. The sleeve has a plurality of projections or lugs near its entering end which engage internal lugs within the speed changing gears.

The effectiveness of this construction lies in the particular shape and arrangement of these lugs. It is possible to construct the lugs with sufficient strength to withstand a relatively great stress which may be caused by an unskillful shifting of gears as the sleeve is moved in either direction. To change gears the lugs thereon travel in a helical path due to the combination of linear and rotary motion imparted thereto. The sides of the lugs are shaped to substantially conform with such helical path whether the sleeve be traveling longitudinally in one direction or the other. As a result of this the lugs upon the sleeve enter into engagement with the lugs within the gears in an uninterrupted helical path presenting substantially the whole area of their clutch faces at the instant of contact. Thus the maximum resistance to breakage is obtained at the time when it is most essential, namely, at the time of engagement. In many transmission mechanisms the actual clutching action takes place at the point where the teeth of the gears mesh and consequently the full force of contact must be withstood at the corner of one or not more than two of the gear teeth which very often results in breakage. The present invention entirely overcomes this difficulty and provides means to smoothly and safely shift from one speed to another. Furthermore the gears may be shifted as rapidly as desired. Since the gears are always in mesh it is not necessary to attempt to avoid a clashing of gear teeth when shifting from one speed to another. There is consequently no time lost in waiting until the interengaging elements are turning at the same or approximately the same speed.

In the specific embodiment shown in the drawings the mechanism is shown encased within a suitable casing 1 which constitutes the supporting frame as well. The driven shaft 2 is journalled in the casing and may receive power from any source such as an automobile engine and may be connected thereto by the usual clutch which is not shown or the clutch may be omitted. In axial alignment therewith is the driving shaft 3 journalled in the opposite wall of the casing 1. A driving shaft actuating gear 4 is located within the casing upon the enlarged cylindrical end 47 of the shaft 3 and in detachable driving engagement therewith by means hereinafter more fully set forth. The gear 4 has an elongated hub portion 5 having a central cylindrical aperture 6 therein. The hub of the gear 4 is enclosed by a bearing in a post 7 which projects from the casing 1. The bearing is a two part bearing having a removable cap 8. This construction provides for the assembling and proper adjustment of the parts. Any other suitable means of support for the gears may be employed however without departing from the invention.

A plurality of gears are rotatably mounted in axial alignment with the gear 4 and supported by bearing similar to that in which the gear 4 is supported. Each of the gears have hub portions similar to that of the gear 4. The number of these gears is not important to the principles of the invention but for purposes of illustration two of such gears 9 and 10 are shown and also a sprocket 11 the function of which will be described hereinafter. The gear 9 has a hub portion 12, and the gear 10 is provided with a hub portion 13, while the sprocket 11 has thereon the hub 14. The gears 9 and 10 and the sprocket 11 are mounted respectively to rotate independently in bearings 15, 16 and 17. Each of the gears 9 and 10 and the sprocket 11 have similar cylindrical apertures. Since the above enumerated elements are in axial alignment and the apertures are of the same size a chamber 18 is formed in which a sleeve 19 is received.

The sleeve 19 has a square central aperture and is slidable longitudinally upon the shaft 2 which is square in cross section to maintain a constant driving connection with the sleeve. Such driving connection may be varied without departing from the invention however. A construction employing a series of longitudinal keyways or flutes may be used.

A shaft 20 is mounted in the casing 1 in parallel relation to the axis of the driven shaft 2 and has rotatably mounted thereon a counter shaft member 21. This counter shaft member is composed of a series of gears and a sprocket which are rigidly connected together. A gear 22 is positioned to mesh with the gear 4, a gear 23 meshes with the gear 9 while another gear 24 meshes with the gear 10. A sprocket 25 is positioned in the same plane as the sprocket 11 and the two are connected by a chain 26. The gears 9 and 10 and the sprocket 11 have lugs or projections 27 extending into their cylindrical apertures. Two such lugs are shown in each of said members but the number of the lugs forms no part of the invention. Interengaging lugs 28 are formed upon the entering end of the sleeve 19 and have clutch faces 29 thereon to engage complementary faces 30 upon the lugs 27.

Any suitable means may be employed to move the sleeve 19 into its various positions. Means are herein shown more or less diagrammatically in Fig. 1. A lever 31 is fulcrumed at 32 upon some fixed part of the motor car or other device and has a slot 33 therein in its lower arm. A pin 34 projects through the slot and into a collar 35. The collar 35 is fitted to a groove 36 in the outer end of the sleeve 19 to permit the sleeve to rotate independently of the collar. The collar 35 has depending therefrom a short stud 37 which extends into a longitudinal slot 38 in a guideway 39 extending from the casing 1 and in a parallel relation to the axis of the sleeve 19.

The collar is thereby held against rotation but may have bodily movement longitudinally of the axis of the sleeve. Thus by moving the lever 31 about its pivot linear motion is imparted to the sleeve through the engagement therewith of the collar 35. The upper arm on the lever extends into a position to be readily grasped by the operator. In order that the operator may know when the sleeve is properly positioned for each speed position means are provided to positively determine the position of the lever corresponding to the proper position of the sleeve. Such means are herein shown as a segment 40 held in fixed position by any convenient means and having notches 41 to correspond with the various positions of the sleeve. A locking lug 42 is located upon the lever 31 in proper position to engage the notches 41 as the lever is moved about its pivot.

The locking lug 42 operates in a well known manner having means not shown to move it automatically into the notches in the segment 40 when the lever is positioned to effect the desired speed. Manual means are provided in the form of a push button 43 connected to the locking lug 42 with which to disengage the lug from the notch and thus disengage the lever from the segment.

The driven shaft 2 is extended to meet and have a bearing in the driving shaft 3. To accomplish this the end of the shaft 2 is reduced in size to form a short stud shaft 44 which has a bearing in an axial aperture 45 in the driving shaft 3. When the sleeve 19 is moved into its extreme left hand position in Fig. 1 its lugs 28 engage the lugs 46 within the enlarged cylindrical end portion 47 of the driving shaft 3. This end portion is enlarged and has a cylindrical aperture 48 therein to permit the sleeve 19 to enter and engage the lugs 46. There is established as a result of this engagement of the lugs 28 with the lugs 46 a positive driving engagement between the driven and the driving shaft. Such engagement is the "high gear" position.

The exterior of the enlarged end of the shaft 3 is cylindrical and of such a size as to permit the hub portion of the gear 4 to be received thereon with a running fit. The gear in turn is supported by the bearing in the post 7 thus providing support for the inner end of the shaft 3.

With the parts in the position shown in Fig. 1 the transmission is running idle. To effect the reverse speed the sleeve is moved to the right until the lug 28 engages the lugs 27 within the sprocket 11 which drives the counter shaft member 21 through the chain 26 and the sprocket 25. Since the gear 22 meshes with the gear 4 a driving relation is thus established between the shafts 2 and 3. To shift into low gear the sleeve 19 is moved into driving engagement with the gear 10 which drives the shaft 3 by means of the gear 24 and the counter shaft member. In a similar manner the intermediate speed is obtained by moving the sleeve into engagement with the gear 9.

One of the important features of the invention resides in the design of the interengaging lugs 27 and 28. As shown in the drawings the lugs are generally triangular in shape having their clutch faces in a plane parallel to the axis of the shaft and tapering to substantially a point at the apex of the triangle opposite to the clutch faces. The lugs on the sleeve are arranged in a reverse position to those within the gears so that the clutch face of one will directly engage the clutch face of the other.

Figure 2:
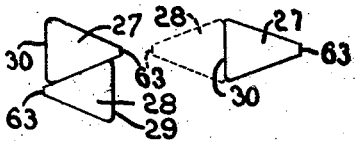
Fig. 2 is a diagrammatic view illustrating the manner in which the clutch faces of the clutching lugs are brought into engagement.
Figures 3, 4:
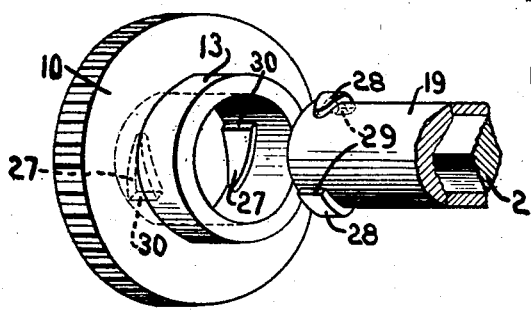
Fig. 3 is a perspective view showing one of the independently rotatable gears with the speed changing member or sleeve about to establish driving connection therewith.
Fig. 4 is a detail view showing the sprocket and chain connection between the reverse sprocket and the counter shaft.
Figure 6:
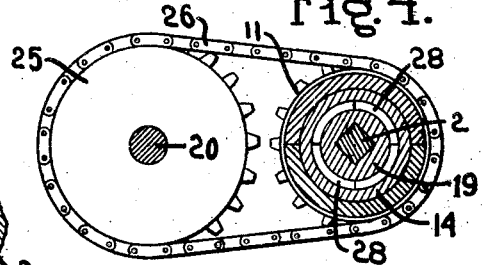
Fig. 6 is a detail view showing the construction of the bearing which supports the independent gears.
Figure 5:
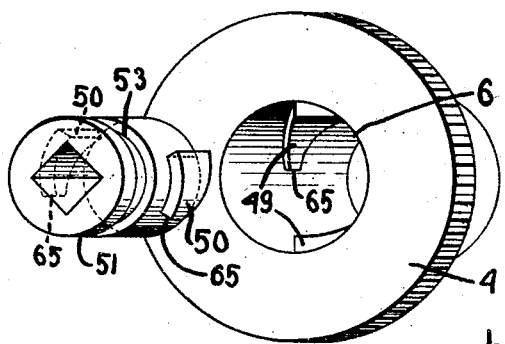
Fig. 5 is a perspective view of the clutching means employed to engage and disengage the driving shaft from the gear system.

As previously pointed out the lugs 28 on the sleeve will follow a helical path when changing from one speed to another. Fig. 2 illustrates diagrammatically a development of the lugs 27 within the gears and one of the lugs 28 upon the sleeve. As the sleeve 19 is moved to shift gears the full line position Fig. 2 may represent the initial relative position of the lugs. This is merely an arbitrary assumption since the lugs may have any initial position when entering into engagement. It will be observed that the lug 28 when moving from this full line position into its full engagement with the lugs 27 as shown in dotted lines may travel in a helical path and at the moment of contact the lugs will present practically the whole area of their clutch faces 29 and 30. If the lug 28 is approaching from the other side of the lugs 27 it may also travel in an uninterrupted helical path into engagement with its cooperating lug. The sides of the lugs may be curved to correspond to the helical path followed by the lugs upon the sleeve however as a practical matter the sides of the lugs may be substantially confined to a plane.

It is desirous to provide a means to disengage the speed changing gear system from the driving shaft when the mechanism is in high gear thus causing the gears to remain idle while doing no useful work. It is a part of this invention to provide such a means. As previously stated a detachable driving connection exists between the driving shaft 3 and the gear 4. Such connection becomes automatically detached when the sleeve 19 is in full engagement with the driving shaft. That is when the lugs 28 are fully engaging the lugs 46. The means employed to engage and disengage these two elements is very similar to the means for engaging the driven shaft with the independent gears.

The gear 4 is provided with lugs 49 projecting into the cylindrical aperture 6 in such position as to engage lugs 50 upon the periphery of a sleeve 51. The sleeve 51 has a square axial aperture and is slidably mounted upon a square section of the shaft 3. Thus a driving connection is established between the sleeve 51 and the shaft which permits longitudinal movement of the sleeve upon the shaft. This driving connection may be established in any way however without departing from the invention. The lugs 49 within the gear 4 and the lugs 50 upon the gear 51 have their opposing sides disposed at an angle so that upon entering into engagement the lugs may travel in a helical path in the same manner as previously described relating to the engagement of the sleeve 19 and the independent gears.

Motion is transmitted to the sleeve 51 by means of an actuator 52 one end of which is bent into a position to engage in a circumferential slot 53 in the sleeve 51. The actuator is guided for longitudinal movement in a guideway 54 upon the casing and projects through and is guided by the casing 1 at 55. As shown in full lines in Fig. 1 the gear 4 and the sleeve 51 are in engagement at which time the actuator 52 projects beyond the casing to its maximum extent.

The collar 35 has projecting therefrom a post 56 which is positioned to engage the end of the actuator 52 upon movement of the sleeve 19 toward its extreme left hand position and upon full engagement of the sleeve with the driving shaft the actuator will have been moved a sufficient distance to disengage the sleeve 51 from the gear 46 permitting the gears to remain idle as shown in dotted lines.

Means are also provided to positively reengage the sleeve 51 and the gear 4 upon the initial movement of the sleeve 19 toward the right. Upon the upper end of the post 56 is pivoted a latch 57 in such position that when the post 56 engages the end of the actuator 52 it will engage a notch 58 near the end thereof. Thus upon motion of the sleeve in a reverse direction the actuator will be carried with it and consequently the sleeve 51 will be brought into driving engagement with the gear 4. The mechanism is thus restored to the proper condition to drive at the intermediate, low, or reverse speeds. Means must be provided to disengage the post 56 from the actuator in order to permit the sleeve 19 to return to its right hand position. Any such means may be employed within the spirit and scope of the claims and means herein is shown comprising an upright 59 extending from the latch and having a horizontal portion 60 at its top which in the position shown in dotted lines Fig. 1 overlies a projection 61 extending from the casing.

The projection 61 has thereon a cam surface 62 so positioned that it will engage the horizontal portion 60 and raise the latch at the instant the sleeve 51 is in full engagement with the gear 4 as the sleeve 19 is moved toward the right. When the sleeve 19 is moved toward the left the latch will merely pass idly over the cam portion of the projection 61 after which the latch may engage the notch in the actuator 52.

Normally the power from the engine will maintain the clutch faces 29 and 30 in contact, however, if for any reason there should be a tendency for the gears to rotate in a direction opposite to that of the sleeve a small flat portion 63 may be formed at the apex of each lug which will serve to maintain driving connection between the two elements under such conditions. The character of these clutch faces 63 may be varied to any extent without departing from the invention. For instance one of the opposing lugs may have a substantially pointed apex while the end of the other lug may be slightly notched to receive the pointed end of the other. The above described driving condition may exist when the car is coasting down grade against the compression which is taking place in the cylinders of the engine. The lugs 46 within the enlarged end 47 of the shaft 3 are provided with relatively long clutch faces 64 which together with the main clutch faces upon lugs 46 form a positive driving connection between the driven and the driving shaft under all conditions. Similar clutch faces 65 are formed upon the lugs 49 and 50 of the gear 4 and sleeve 19.

It will be noted that in changing from one speed to another the lugs 28 upon the sleeve 19 pass through a neutral point at which time there is no driving engagement between the driven shaft and the driving shaft. Such a construction greatly facilitates the operation of changing the speed ratio of the mechanism since the source of power is entirely disconnected from the load before it is again connected thereto at a different speed ratio. It is possible by the use of this invention to change the speed ratio without the necessity of inserting a disengaging means between the source of power and the mechanism which may be the usual clutch, without causing any dangerous stresses to be imposed upon the various elements of the device.

Having thus described the invention, what is claimed as new, and desired to be secured by Letters Patent, is:

1. A power transmission mechanism comprising a driven shaft, a sleeve slidable transversely upon and in driving engagement with said driven shaft, a driving shaft in axial alignment with said driven shaft having a clutch member slidably mounted upon the end thereof and in driving engagement therewith, said clutch member having lugs thereon, a driving shaft actuating gear independently rotatable upon said driving shaft and having lugs thereon to engage the lugs on said clutch member, a plurality of independently operable gears, means for transmitting rotation from said independent gears to said driving shaft actuating gear, means rigid with and operable by the longitudinal sliding movement of said sleeve selectively to engage and rotate an independently operable gear or directly engage and drive said driving shaft, means acting when said sleeve and said driving shaft are directly engaged to disengage said clutch member from said driving shaft actuating gear, and a rigid actuator guided to move longitudinally of said driven shaft operable as a positive connection between said sleeve and said clutch member to re-engage the said clutch member with said driving shaft actuating gear solely by the movement of the sleeve when the direct engagement of the driving shaft and sleeve is broken.

2. A power transmission mechanism comprising a driven shaft, a sleeve slidable transversely upon and in driving engagement with said driven shaft, a driving shaft in axial alignment with said driven shaft having a clutch member slidably mounted upon the end thereof and in driving engagement therewith said clutch member having lugs thereon, a driving shaft actuating gear independently rotatable upon said driving shaft and having lugs thereon to engage the lugs on said clutch member, a plurality of independently operable gears, means for transmitting rotation from said independent gears to said driving shaft actuating gear, means rigid with and operable by the longitudinal sliding movement of said sleeve selectively to engage and rotate an independently operable gear or at the end of the inward movement of the sleeve to directly engage and drive said driving shaft, an abutment connected to and movable with said sleeve, a clutch actuator movable longitudinally of the shafts connected at one end to said clutch member and having its other end in the path of said abutment to be engaged thereby at the end of its inward movement to disengage said clutch member from said driving shaft actuating gear thereby permitting direct actuation of the driving shaft without rotation of said independent gears and means temporarily connecting said clutch actuator to said abutment acting upon the initial movement of the sleeve in the opposite direction to re-engage said clutch member with the driving shaft actuating gear and after such engagement to automatically disengage from the said clutch actuator.

3. A power transmission mechanism comprising a driven shaft, a driving shaft in alignment therewith, said driving shaft having an enlarged cylindrical portion at one end provided axially thereof with a cylindrical aperture, a sleeve slidable upon and splined to said driven shaft, a clutch member slidable upon and splined to the driving shaft, a driving shaft actuating gear concentric with the driving shaft and rotatively mounted on the enlarged cylindrical portion thereof, said gear having internal clutch lugs to co-operate with said clutch member, a plurality of independently rotatable gears of different diameters having cylindrical apertures concentric with the sleeve, means for transmitting rotation from each of said independent gears to said driving shaft actuating gear, means operable to move the sleeve selectively into and out of driving engagement with any of said independent gears or into and out of driving engagement with said driving shaft, and means connected with said sleeve acting upon its movement into and out of engagement with the driving shaft to move said clutch member out of and into driving engagement with said driving shaft actuating gear whereby rotation will not be imparted to the intermediate gears when the sleeve is in driving engagement with the driving shaft, the said means for effecting engagement and disengagement in each case comprising cooperating lugs having their clutch faces parallel to the axis of the driving and driven shafts, the lugs in the cylindrical aperture at the inner end of the driving shaft, within the driving shaft actuating gear and upon the clutch member having one side tapered from the clutch face and all the other lugs having both sides tapered from the clutch face to form substantially V-shaped projections.

In testimony whereof, I have signed my name to this specification.

CLIFFORD A. COOK.